United States Patent
Barron

(10) Patent No.: US 8,023,520 B2
(45) Date of Patent: Sep. 20, 2011

(54) SIGNALING PACKET

(75) Inventor: Dwight L. Barron, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2853 days.

(21) Appl. No.: 10/401,236

(22) Filed: Mar. 27, 2003

(65) Prior Publication Data

US 2004/0190557 A1 Sep. 30, 2004

(51) Int. Cl.
*H04J 1/14* (2006.01)
*H04L 12/54* (2006.01)

(52) U.S. Cl. ............... 370/410; 370/426; 370/496

(58) Field of Classification Search ............... None
See application file for complete search history.

(56) References Cited

U.S. PATENT DOCUMENTS

| | | | |
|---|---|---|---|
| 5,325,532 A | 6/1994 | Crosswy et al. | |
| 5,675,807 A | 10/1997 | Iswandhi et al. | |
| 5,737,604 A | 4/1998 | Miller et al. | |
| 5,751,932 A | 5/1998 | Horst et al. | |
| 5,809,285 A | 9/1998 | Hilland | |
| 5,815,707 A | 9/1998 | Krause et al. | |
| 5,822,571 A | 10/1998 | Goodrum et al. | |
| 5,870,568 A | 2/1999 | Culley et al. | |
| 5,872,941 A | 2/1999 | Goodrum et al. | |
| 5,914,953 A | 6/1999 | Krause et al. | |
| 5,948,111 A | 9/1999 | Taylor et al. | |
| 5,964,835 A | 10/1999 | Fowler et al. | |
| 5,983,269 A | 11/1999 | Mattson et al. | |
| 6,018,620 A | 1/2000 | Culley et al. | |
| 6,047,323 A | 4/2000 | Krause | |
| 6,070,198 A | 5/2000 | Krause et al. | |
| 6,070,253 A | 5/2000 | Tavallaei et al. | |
| 6,122,287 A * | 9/2000 | Ohanian et al. | 370/465 |
| 6,157,967 A | 12/2000 | Horst et al. | |
| 6,163,834 A | 12/2000 | Garcia et al. | |
| 6,233,702 B1 | 5/2001 | Horst et al. | |
| 6,483,845 B1 * | 11/2002 | Takeda et al. | 370/429 |
| 6,484,208 B1 | 11/2002 | Hilland | |
| 6,493,343 B1 * | 12/2002 | Garcia et al. | 370/394 |
| 6,496,940 B1 | 12/2002 | Horst et al. | |
| 6,502,203 B2 | 12/2002 | Barron et al. | |
| 6,748,442 B1 * | 6/2004 | Keller | 709/232 |
| 6,823,437 B2 * | 11/2004 | Boyd et al. | 711/170 |
| 6,981,195 B2 * | 12/2005 | Newcombe et al. | 714/758 |
| 2003/0169775 A1 * | 9/2003 | Fan et al. | 370/503 |

FOREIGN PATENT DOCUMENTS

EP  0757318 A2  2/1997

* cited by examiner

*Primary Examiner* — Chi Pham
*Assistant Examiner* — Soon-Dong D Hyun

(57) ABSTRACT

The disclosed embodiments relate to a signaling packet that includes an indication that the packet is not part of a data transmission. The signaling packet may also include a specific value that is adapted to signal a condition. The indication may be purposely set to indicate that the signaling packet is not part of the data transmission to facilitate examination of the specific value by a receiver of the signaling packet.

20 Claims, 4 Drawing Sheets

SIGNALING PACKET

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. One technique or strategy for transferring information between the memories of computer systems is remote direct memory access, which may be referred to as RDMA. In an open network environment, however, some computer systems may be enabled to perform RDMA transactions and others may not be so enabled. The RDMA systems in this environment may not perform up to full potential because they may not be aware of which other systems in the network environment are capable of performing RDMA transactions.

BRIEF DESCRIPTION OF THE DRAWINGS

The foregoing and other advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve ability of computer systems to remotely access the memory of other computer systems. One such specification under development is the RDMA Consortium Protocols Verb specification, which is hereby incorporated by reference. The verbs defined by this specification may correspond to commands or actions that may form a command interface for data transfers between memories in computer systems, including the formation and management of queue pairs, memory windows, protection domains and the like.

RDMA may refer to the ability of one computer to directly place information in the memory space of another computer, while minimizing demands on the central processing unit ("CPU") and memory bus. In an RDMA system, an RDMA layer may interoperate over any physical layer in a Local Area Network ("LAN"), Server Area Network ("SAN"), Metropolitan Area Network ("MAN"), or Wide Area Network ("WAN").

Figure 1:
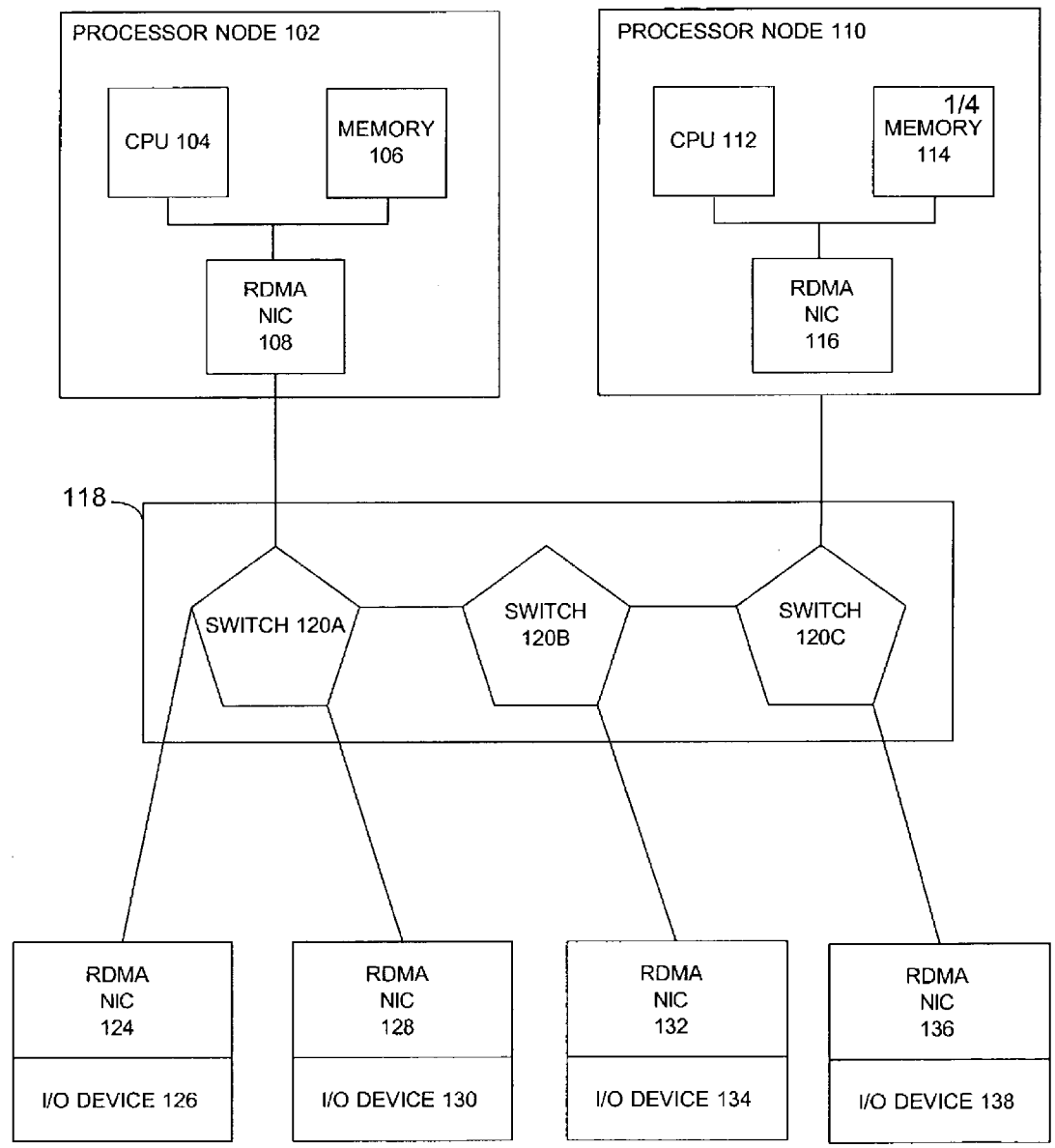
FIG. 1 is a block diagram illustrating a computer network in accordance with embodiments of the present invention.

Referring now to FIG. 1, a block diagram illustrating a computer network in accordance with embodiments of the present invention is illustrated. The computer network is indicated by the reference numeral 100 and may comprise a first processor node 102 and a second processor node 110, which may be connected to a plurality of I/O devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. The CPU 104 may be connected to the memory 106 and the RNIC 108 over an internal bus or connection. The memory 106 may be utilized to store information for use by the CPU 104, the RNIC 108 or other systems or devices. The memory 106 may include various types of memory such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given equal priority and the same access to the memory 106 or 114. In addition, the memories may be accessible by remote devices such as the I/O devices 126, 130, 134 and 138 via the switch network 118. The first processor node 102, the second processor node 110 and the I/O devices 126, 130, 134 and 138 may exchange information using queue pairs ("QPs"). The exchange of information using QPs is explained with reference to FIG. 2.

Figure 2:
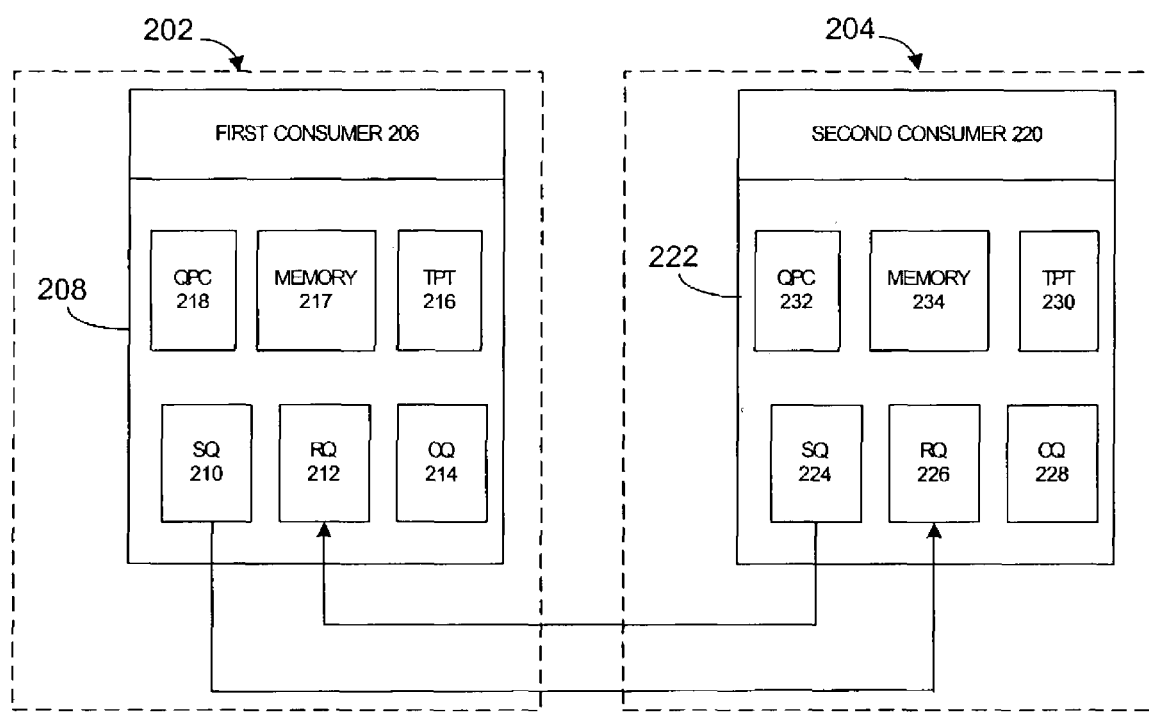
FIG. 2 is a block diagram illustrating a simplified exchange between computers in a computer network in accordance with embodiments of the present invention.

FIG. 2 is a block diagram that illustrates the use of a queue pair to transfer data between devices in accordance with embodiments of the present invention. The figure is generally referred to by the reference numeral 200. In FIG. 2, a first node 202 and a second node 204 may exchange information using a QP. The first node 202 and second node 204 may correspond to any two of the first processor node 102, the second processor node 110 or the I/O devices 126, 130, 134 and 138 (FIG. 1). As set forth above with respect to FIG. 1, any of these devices may exchange information in an RDMA environment.

The first node 202 may include a first consumer 206, which may interact with an RNIC 208. The first consumer 206 may comprise a software process that may interact with various components of the RNIC 208. The RNIC 208, may correspond to one of the RNICs 108, 116, 126, 130, 134 or 138 (FIG. 1), depending on which of devices associated with those RNICs is participating in the data transfer. The RNIC 208 may comprise a send queue 210, a receive queue 212, a completion queue ("CQ") 214, a memory translation and protection table ("TPT") 216, a memory 217 and a QP context 218.

The second node 204 may include a second consumer 220, which may interact with an RNIC 222. The second consumer 220 may comprise a software process that may interact with various components of the RNIC 222. The RNIC 222, may correspond to one of the RNICs 108, 116, 126, 130, 134 or 138 (FIG. 1), depending on which of devices associated with those RNICs is participating in the data transfer. The RNIC 222 may comprise a send queue 224, a receive queue 226, a completion queue 228, a TPT 230, a memory 234 and a QP context 232.

The memories 217 and 234 may be registered to different processes, each of which may correspond to the consumers 206 and 220. The queues 210, 212, 214, 224, 226, or 228 may be used to transmit and receive various verbs or commands, such as control operations or transfer operations. The completion queue 214 or 228 may store information regarding the sending status of items on the send queue 210 or 224 and receiving status of items on the receive queue 212 or 226. The TPT 216 or 230 may comprise a simple table or an array of page specifiers that may include a variety of configuration information in relation to the memories 217 or 234.

The QP associated with the RNIC 208 may comprise the send queue 210 and the receive queue 212. The QP associated with the RNIC 222 may comprise the send queue 224 and the receive queue 226. The arrows between the send queue 210 and the receive queue 226 and between the send queue 224 and the receive queue 212 indicate the flow of data or information therebetween. Before communication between the RNICs 208 and 222 (and their associated QPs) may occur, the QPs may be established and configured by an exchange of commands or verbs between the RNIC 208 and the RNIC 222. The creation of the QP may be initiated by the first consumer 206 or the second consumer 220, depending on which consumer desires to transfer data to or retrieve data from the other consumer.

Information relating to the configuration of the QPs may be stored in the QP context 218 of the RNIC 208 and the QP context 232 of the RNIC 222. For instance, the QP context 218 or 232 may include information relating to a protection domain ("PD"), access rights, send queue information, receive queue information, completion queue information, or information about a local port connected to the QP and/or remote port connected to the QP. However, it should be appreciated that the RNIC 208 or 222 may include multiple QPs that support different consumers with the QPs being associated with one of a number of CQs.

To allow the nodes 202 and 204 to exchange information in an enhanced manner, the messages that exchange the information and setup the communications may utilize different layers of protocols. As a means of reducing the load on the resources, such as CPU cycles, systems may be designed to bypass the operating system with certain protocols. These protocols may include WinSock Direct ("WSD") and Sockets Direct Protocol ("SDP"). These protocols may allow unmodified socket applications, which may be consumers 206 and 220, to take advantage of the performance characteristics of RDMA protocols, such as protocol offload, OS bypass, true zero copy of data. However, for this design to function properly, the nodes 202 and 204 may have to agree to use the RDMA mode without assistance from the consumers 206 and 220. In addition, it may be advantageous for the protocols to function in an open or heterogeneous environment. Thus, a transparent control communication that does not impact the application or the network may be advantageous. A computer stack in the context of communicating across a network is explained with reference to FIG. 3.

Figure 3:
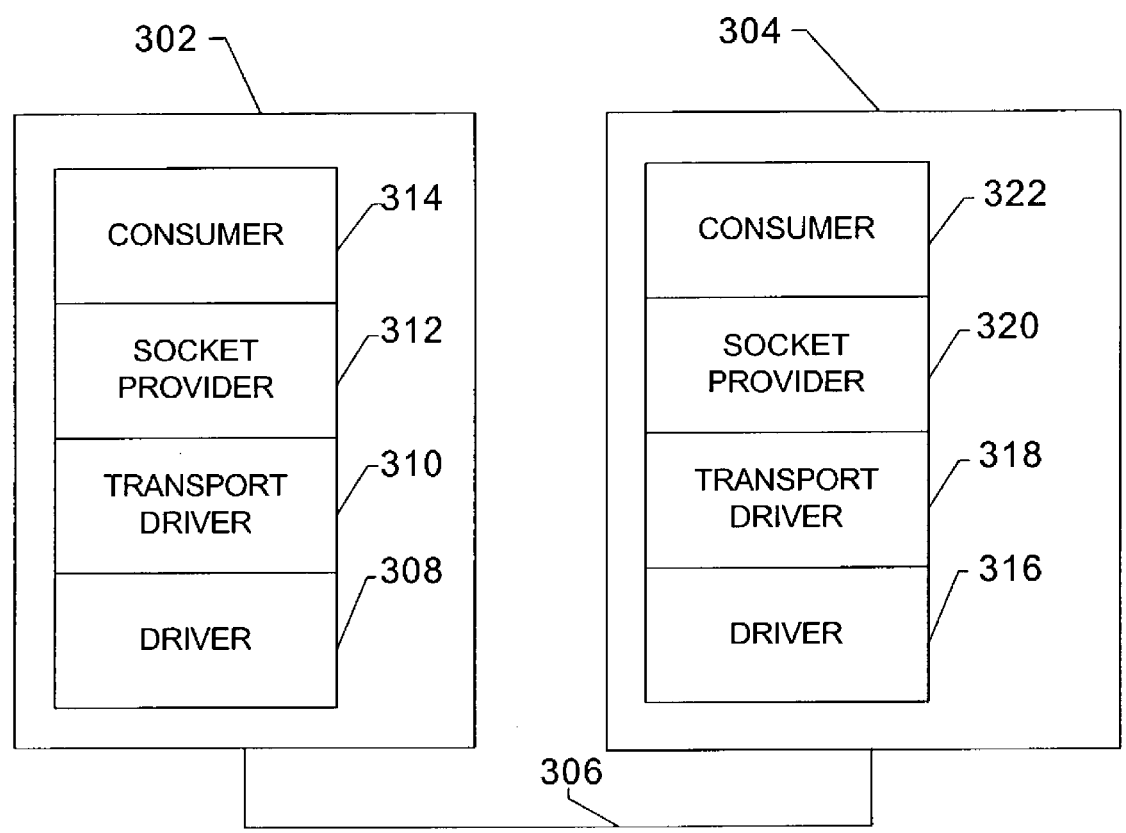
FIG. 3 is a block diagram of a simplified protocol stack in accordance with embodiments of the present invention is illustrated.

Turning to FIG. 3, a block diagram of a simplified protocol stack in computer system in accordance with embodiments of the present invention is illustrated. In this diagram 300, a first node 302 and a second node 304, such as the first and second nodes 202 and 204 of FIG. 2, may be connected via a network 306, such as the switch network 118 of FIG. 1. The nodes 302 and 304 may exchange packets of information across the network 306 using various protocols. The first and second nodes 302 and 304 may respectively include a driver 308 or 316 that may receive and transmit the packets across the network 306. The driver 308 or 316 may exchange packets with a transport driver 310 or 318 in each respective node 302 or 304. The transport driver 310 or 318 may provide standard methods for protocol addressing, sending and receiving datagrams, writing and reading on streams, and/or detecting disconnects for interfacing with an application-programming interface ("API"), for instance. The transport driver 310 or 318 may also exchange packets with a socket provider 312 or 320 in each of the respective nodes 302 or 304. The socket provider 312 or 320 may provide connection-oriented service or port for a specific application to use in communicating with other nodes 302 or 304. Finally, the packets may be exchanged with a consumer 314 or 322, which may include an API, consumers 206 or 220 of FIG. 2, or other protocol layers.

To enable an exchange of data between the nodes 302 and 304, the nodes 302 and 304 may first utilize the network 306 to exchange set-up or configuration information to establish a data path. For instance, the nodes 302 and 304 may exchange RDMA operations over the network 306 via Transmission Control Protocol ("TCP"), which may be used to further process the information within the packets to maintain the information that is being transmitted. A component, such as the transport driver 310 or 318, may manage the TCP layer by assembling a message into multiple packets, which may be transmitted across the network 306 to another node 302 or 304. At the other node 302 or 304, the packet may be received by a component that uses the TCP layer to reassemble the packets into the original message. In a network 306 that uses the TCP layer, a variety of fields may be used by the TCP layer to encapsulate commands or operations received from an upper layer protocol. For instance, the TCP layer may include fields, such as a source port, a destination port, a sequence number, an acknowledgement number, a length, a checksum, and other fields in addition to the information from the upper level layer.

Because the packets transmitted from a node 302 or 304 may follow any path across the network 306, the TCP layer may prevent duplicate information from being further processed by other components that may process the upper layer protocols, such as the socket provider 312 or 320 or the consumer 314 or 322. The TCP layer may be a reliable transport protocol that tracks the acknowledgements from the receiving node 302 or 304 for every packet sent. To provide this reliability, the TCP layer may use a sequence number field to increment the value within the field for each packet that is transmitted to a node 302 or 304. In addition, the TCP layer may use an acknowledgement number field to increment the value in the field for each packet that has been received by the other node 302 or 304. By incrementing these fields the TCP layer may be able to maintain the data that has been sent and unacknowledged to ensure that the packets are not lost.

Furthermore, the incrementing of the sequence number and/or the acknowledgement number fields may allow the TCP layer to drop any duplicated packets based on the sequence number in the header of the packet. This feature may allow the nodes 302 or 304 to prevent duplicate copies of the same data from being processed by the consumer 314 or 322. For instance, the first node 302 may receive from second node 304 a packet that includes a sequence number of 313 and an acknowledgement number of 311. If the second node 304 sends a packet with a sequence number of 312 and an acknowledgement number of 311, the first node 302 may receive the packet and increase the acknowledgment number to 312. However, if the second node 304 sends a packet with a sequence number of 310, the first node 302 may discard the packet because the packet sequence number of 310 is equal to or below the acknowledgement number of 311 and may contain duplicate information. Thus, the TCP layer may prevent duplicate information from being received by the node 302 or 304.

A "keep-alive" packet or signaling packet may be used by a node 302 or 304 to maintain a connection between nodes 302 and 304 or to verify that the remote node 302 or 304 is operational. The keep-alive packet may be an acknowledgement packet that has the sequence number that is used as an indication and/or purposely below the current sequence number. While such a keep-alive packet may not include any additional information, the other fields of the message may be implemented with additional properties that may be used as a signaling mechanism. The properties may be in the payload data, header information, or trailer information. For instance, the signaling mechanism may be a specific pattern and/or a specific sequence of value relative to the current window, such as some fixed number of bytes. An RDMA-enabled node, such as the node 302 or the node 304, may be adapted to examine the packets that are equal to or below the acknowledgment number or marked as a duplicate packet. If a property of such a packet (such as a value in one of the fields or the like correspond to predetermined criteria or condition, such as being equal to a predetermined value, then the node 302 or 304 may send an RDMA initialization request or perform some other predetermined function. Thus, an RDMA-enabled node may signal its presence to other RDMA-enabled nodes in the network. If the system receiving such a packet is a non-RDMA enabled system, the component handling the TCP layer or TCP mechanism may discard the packet as a normal operation without impacting the performance of that system.

In operation, the signaling mechanism may operate in a manner consistent with the existing networking standards and protocols. For instance, the signaling mechanism may be a specific condition or pattern of numbers in the payload data. The second node 304 may place the specific value into the packet and may send the keep-alive packet with the specific value to first node 302. Once the first node 302 receives the packet, the first node 302 may examine the packet to determine if the packet has a sequence number or indication equal to or below the acknowledgement number. Because the packet is a keep-alive packet, the packet may have a sequence number equal to or below the acknowledgement number. If the first node 302 is RDMA enabled, the first node 302 may examine the packet to determine if the specific value is present. The specific pattern may indicate to the first node 302 that an RDMA initialization request should be sent to the second node 304. However, if the first node 302 is non-RDMA enabled, then the first node 302 may discard the packet without determining if the specific pattern is present. With either situation, the network 306 and the nodes 302 and 304 may be able to operate without negatively impacting the network 306.

Advantageously, by utilizing the keep-alive packets, the nodes 302 and 304 may be able to operate over existing networks without using a new network service or protocol. In addition, embodiments of the present invention may be implemented to allow heterogeneous systems to exist on the same network 306. Furthermore, the signaling mechanism may be transparent to existing TCP implementations and may not have any adverse effects on the existing networks because the signaling mechanism conforms to the existing standards. Accordingly, a system employing one or more of the disclosed embodiments may exchange information with other systems faster because of the signaling mechanism.

Figure 4:
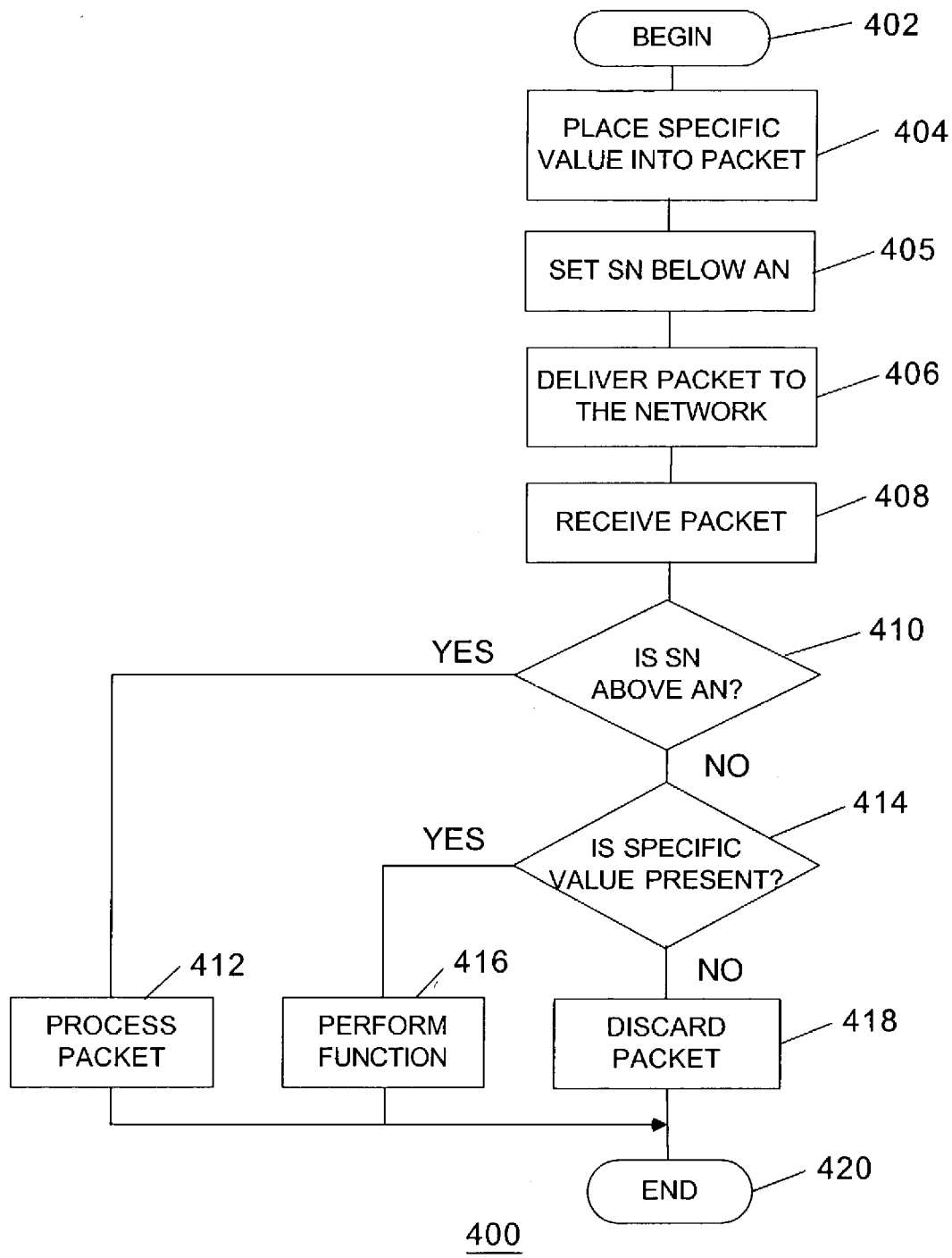
FIG. 4 is a flow chart that shows a process in accordance with embodiments of the present invention.

Turning to FIG. 4, a flow diagram is illustrated in accordance with embodiments of the present invention. In the diagram, generally referred to by reference numeral 400, a signaling mechanism may be implemented and may be utilized in a system, such as the exemplary computer network 100 (FIG. 1). The process begins at block 402. At block 404, a specific value may be placed into a packet at a first node, such as one of the nodes 302 or 304 of FIG. 3. The specific value may be placed into the header, the data payload or the trailer of the packet. Also, the packet may be a keep-alive packet as defined in TCP protocols or may be a message with a sequence number equal to or below the acknowledgment number. In addition, the specific value may be a specific pattern, a specific sequence value relative to the current window, and/or some fixed number of bytes. This specific value may indicate a command or operation for the other node or pass along information to the node. At block 405, the sequence number ("SN") may be set below the acknowledgement number ("AN") to indicate that the packet is a keep alive packet. Then, as shown in block 406, the packet may be delivered to a network from the node, which may be an RDMA enabled system. The network may be any topology or architecture, such as the switch network 118 of FIG. 1 or network 306 of FIG. 3.

After the packet has been delivered to the network, in block 408, the packet may be received at a second node, such as the node 302 or 304 of FIG. 3. The second node may be an RDMA enabled node. The packet may be modified or may have the lower layers of the protocols changed along the path. Once the packet is received, the second node may examine the packet to determine if the sequence number ("SN") is below the acknowledgement number ("AN") for that connection. If the sequence number of the packet is not equal to or below the acknowledgement number, then the second node may further process the packet at block 412. The further processing of the packet may involve manipulating the packet with other components, such as the socket provider 312 or 320 or consumer 314 or 322. However, if the sequence number of the packet is equal to or below the acknowledgement number, then the second node may determine if the specific value is within the packet at block 414. At block 414, the second node may examine the packet to determine if the specific value is present. If the specific value is present, then the remote system may use the specific value to perform a command or prepare for a further operation at block 416. However, if the specific value is not present, the second node may discard the packet at block 418. After either block 412, 416, or 418, the process may end, as shown at block 420.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A tangible computer readable medium encoded with computer executable instructions comprising:
   code that provides an indication that a signaling packet is not part of a specific data transmission;
   code that provides a specific value that signals an ability to communicate according to a particular communication protocol; and
   wherein the indication is purposely set to indicate that the signaling packet is not part of the specific data transmission to facilitate examination of the specific value by a receiver of the signaling packet that has the ability to communicate according to the particular communication protocol.

2. The tangible computer readable medium set forth in claim 1, wherein the indication that the signaling packet is not part of a specific data transmission is contained in a sequence number field.

3. The tangible computer readable medium set forth in claim 1, wherein the signaling packet is transmitted according to the transmission control protocol ("TCP").

4. The tangible computer readable medium set forth in claim 1, wherein the particular communication protocol comprises a remote direct memory access ("RDMA") protocol.

5. The tangible computer readable medium set forth in claim 1, wherein the receiver initiates a communication according to the particular communication protocol in response to the signaling packet.

6. The tangible computer readable medium set forth in claim 1, wherein the receiver responds to the signaling packet if the receiver has the ability to communicate according to the particular communication protocol.

7. The tangible computer readable medium set forth in claim 1, wherein the receiver discards the signaling packet if the receiver does not have the ability to communicate according to the particular communication protocol.

8. A computer network, comprising:
   a plurality of computer systems;
   at least one input/output device;
   a switch network that connects the plurality of computer systems and the at least one input/output device for communication; and
   wherein the plurality of computer systems and the at least one input/output device employ a signaling packet, the signaling packet comprising:
   an indication that the signaling packet is not part of a specific data transmission;
   a specific value that signals an ability to communicate according to a particular communication protocol; and
   wherein the indication is purposely set to indicate that the signaling packet is not part of the specific data transmission to facilitate examination of the specific value by a receiver of the signaling packet that has the ability to communicate according to the particular communication protocol.

9. The computer network set forth in claim 8, wherein the indication that the signaling packet is not part of the specific data transmission is contained in a sequence number field.

10. The computer network set forth in claim 8, wherein the signaling packet is transmitted according to the transmission control protocol ("TCP").

11. The computer network set forth in claim 8, wherein the particular communication protocol comprises a remote direct memory access ("RDMA") protocol.

12. The computer network set forth in claim 8, wherein the receiver initiates a communication according to the particular communication protocol in response to the signaling packet.

13. The computer network set forth in claim 8, wherein the receiver responds to the signaling packet if the receiver has the ability to communicate according to the particular communication protocol.

14. The computer network set forth in claim 8, wherein the receiver discards the signaling packet if the receiver does not have the ability to communicate according to the particular communication protocol.

15. A method of signaling a condition, the method comprising:
   setting an indication in a signaling packet that the signaling packet is not part of a specific data transmission; and
   including a specific value in the signaling packet indicative of an ability to communicate according to a particular communication protocol.

16. The method set forth in claim 15, comprising:
   examining the specific value to determine the presence of the indication;
   responding to the signaling packet in the particular communication protocol.

17. The method set forth in claim 15, comprising discarding the signaling packet if a receiver of the packet does not have the ability to communicate according to the particular communication protocol.

18. The method set forth in claim 15, comprising initiating a communication channel in response to the signaling packet if a receiver of the packet has the ability to communicate according to the particular communication protocol.

19. The method set forth in claim 15, wherein the particular communication protocol comprises a remote direct memory access ("RDMA") protocol.

20. The method set forth in claim 15, comprising transmitting the signaling packet according to the transmission control protocol ("TCP").

* * * * *